(12) United States Patent
Muhlestein et al.

(10) Patent No.: US 7,917,598 B1
(45) Date of Patent: *Mar. 29, 2011

(54) SYSTEM AND METHOD FOR ADMINISTERING A FILER HAVING A PLURALITY OF VIRTUAL FILERS

(75) Inventors: Mark Muhlestein, Tuscon, AZ (US); Gaurav Banga, Sunnyvale, CA (US); Tim Thompson, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1068 days.

This patent is subject to a terminal disclaimer.

(21) Appl. No.: 11/704,625

(22) Filed: Feb. 9, 2007

Related U.S. Application Data

(63) Continuation of application No. 10/099,332, filed on Mar. 15, 2002, now Pat. No. 7,194,519.

(51) Int. Cl.
*G06F 15/167* (2006.01)
*G06F 13/00* (2006.01)

(52) U.S. Cl. ......... 709/215; 711/100; 711/211; 711/147

(58) Field of Classification Search .................. 709/214, 709/215; 711/100, 147, 148, 211
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,835,720 A | 11/1998 | Nelson et al. | |
| 5,870,550 A | 2/1999 | Wesinger et al. | |
| 5,931,918 A | 8/1999 | Row et al. | |
| 5,941,972 A | 8/1999 | Hoese et al. | |
| 5,963,962 A | 10/1999 | Hitz et al. | |
| 6,038,570 A | 3/2000 | Hitz et al. | |
| 6,065,037 A | 5/2000 | Hitz et al. | |
| 6,167,446 A | 12/2000 | Lister et al. | |
| 6,230,200 B1 | 5/2001 | Forecast et al. | |
| 6,286,047 B1 | 9/2001 | Ramanathan et al. | |
| 6,425,035 B2 | 7/2002 | Hoese et al. | |
| 6,647,422 B2 * | 11/2003 | Wesinger et al. | 709/228 |
| 6,813,766 B2 | 11/2004 | Hay | |
| 6,816,905 B1 | 11/2004 | Sheets et al. | |
| 6,868,442 B1 | 3/2005 | Burdeau | |

(Continued)

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

(Continued)

*Primary Examiner* — Van H Nguyen
(74) *Attorney, Agent, or Firm* — Cesari and McKenna, LLP

(57) ABSTRACT

A method and apparatus for operating a computer data storage system is disclosed. A computer data storage system is administered by a physical server administrator. The physical server administrator administers the computer data storage system with a full administrative capability. The physical server administrator creates one or more virtual servers, each virtual server administrated by a virtual server administrator. Each virtual server administrator has a designated subset of the full administrative capability for administrating the virtual server.

28 Claims, 7 Drawing Sheets

U.S. PATENT DOCUMENTS

| | | | |
|---|---|---|---|
| 6,883,065 B1 | 4/2005 | Pittelkow et al. | |
| 6,895,429 B2 | 5/2005 | Banga et al. | |
| 6,944,785 B2 | 9/2005 | Gadir et al. | |
| 6,978,232 B1 * | 12/2005 | Tobler | 703/21 |
| 7,024,427 B2 | 4/2006 | Bobbitt et al. | |
| 7,103,647 B2 * | 9/2006 | Aziz | 709/220 |
| 7,194,519 B1 | 3/2007 | Muhlestein et al. | |
| 7,360,034 B1 | 4/2008 | Muhlestein et al. | |
| 2003/0018927 A1 | 1/2003 | Gadir et al. | |

OTHER PUBLICATIONS

Fielding, R., et al., Request for Comments (RFC) 2616, Hypertext Transfer Protocol—HTTP/1.1, Jun. 1999.

Hitz, Dave et al., File System Design for an NFS File Server Appliance, Technical Report 3002, Rev. C395, presented Jan. 19, 1994, 23 pages.

* cited by examiner

| | |
|---|---|
| NAME 602 | |
| VFILER LIST 606 | UUID 604 |
| VFSTORE LIST 610 | IPSPACE ID 608 |
| | VFNET LIST 612 |

/ETC/PASSWD, GROUP 616

| MULTI-PROTOCOL MAPPING LIBRARY 618 | | | ADMIN MAPPING LIBRARY 619 | |
|---|---|---|---|---|
| CIFS 620 | HTTP 630 | NIS 660 | DNS 670 | RSH 640 | TELNET 650 | REGISTRY 680 |
| DOMAIN CNTRL 622 | | | | | | |
| ACTIVE SESSIONS 624 | | | | | | |
| CONTROL BLOCKS 625 | | | | | | |
| SECURITY DOMAIN 626 | | | | | | |
| PID 628 | | | | | | |

SYSTEM AND METHOD FOR ADMINISTERING A FILER HAVING A PLURALITY OF VIRTUAL FILERS

The present application is a continuation of U.S. patent application Ser. No. 10/099,332, filed on Mar. 15, 2002, now issued as U.S. Pat. No. 7,194,519 on Mar. 20, 2007.

FIELD OF THE INVENTION

The present invention relates to storage systems and, more specifically, to a technique for administering a storage system, such as a file server or filer.

BACKGROUND OF THE INVENTION

A file server is a computer that provides file service relating to the organization of information on writeable persistent storage devices, such memories, tapes or disks. The file server or filer may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

A storage system may be further configured to operate according to a client/server model of information delivery to thereby allow many clients to access an application service executed by a server, such as a file server. In this model, the client may comprise an application executing on a computer that "connects" to the file server over a computer network, such as a point-to-point link, shared local area network, wide area network or virtual private network implemented over a public network, such as the Internet. Each client may request the services of the file system on the file server by issuing file system protocol messages (in the form of packets) to the server over the network. It should be noted, however, that the file server may alternatively be configured to operate as an assembly of storage devices that is directly-attached to a (e.g., client or "host") computer. Here, a user may request the services of the file system to access (i.e., read and/or write) data from/to the storage devices.

One type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system, such as a filer, is the Write Anywhere File Layout (WAFL™) file system available from Network Appliance, Inc., Sunnyvale, Calif. The WAFL file system is implemented as a microkernel within an overall protocol stack of the filer and associated disk storage.

The disk storage is typically implemented as one or more storage "volumes" that comprise a cluster of physical storage devices (disks), defining an overall logical arrangement of disk space. Each volume is generally associated with its own file system. A filer typically includes a large amount of storage (e.g., 6 terabytes) with the ability to support many (thousands) of users. This type of storage system is generally too large and expensive for many applications or "purposes". Even a typical minimum storage size of a volume (or file system) is approximately 150 gigabytes (GB), which is still generally too large for most purposes.

Rather than utilizing a single filer, a user may purchase a plurality of smaller servers, wherein each server is directed to accommodating a particular purpose of the user. However, the acquisition of many smaller servers may be more costly than the purchase of a single filer. Furthermore, the cost of maintenance and administration of many smaller servers is typically substantially more than the cost of maintaining and administering a single filer. Therefore, it is often desirable to consolidate many servers within a single filer platform in a manner that logically embodies those servers. Server consolidation is thus defined as the ability to provide many logical or virtual servers within a single physical server platform. Some prior server consolidation solutions are configured to run multiple instances of a process, such as an application service. Other server consolidation solutions provide many independent servers that are essentially "racked together" within a single platform. Examples of virtual servers embodied within a single platform are web servers, database servers, mail servers and name servers.

Server consolidation is particularly useful in the case of a storage server provider (SSP). An SSP serves ("hosts") data storage applications for multiple users or clients within a single, physical platform (i.e., a filer); several filers can then be managed in a single "data center". The data center is centrally maintained by the SSP to provide safe, reliable storage service to the clients. In a typical configuration, the data center may be coupled to a plurality of different client environments, each having an independent private internal network. Each internal network may be associated with a different client or division of a client and, thus, the data traffic must be separately maintained within the physical platform.

There are many tasks involved in managing or "administering" a data center configured to host data storage applications for different clients. Some of those tasks include manipulating physical hardware or other common "system" aspects of the server platform, including configuration of operating system software and networks. Other tasks involve managing and allocating logical or "application-specific" aspects of the server, such as storage resources for the clients. For a server having a plurality of virtual servers, there is a need for one manager to administer the common system aspects of the platform. An alternative approach is to have a client manager on each private internal network coupled to a virtual server, wherein each manager has a portion of the responsibility for administering those common platform aspects. That approach, however, is burdensome and, in some cases, impractical.

Prior server consolidation solutions that implement virtual servers often provide "total" virtualized administrative capabilities to each server and its manager. Yet, many clients only want the ability to access to their data in a reliable manner without having the responsibility of managing the system administrative aspects of the server, such as performing backup operations. If the client were to "off load" those system administrative responsibilities onto a third party, the client would still want to maintain the privacy of its internal network environment and ensure that the third party does not have access to the client's data. This may be difficult to ensure in the case of a totally virtualized administrative server implementation. A typical SSP implementation, however, may provide a system manager that is responsible for managing those administrative functions that a client would rather not manage. The SSP solution must be configured to enable client managers of the application-specific aspects of the data center platform to access ("communicate with") the platform.

To that end, the SSP solution may provide an "administrative proxy" embodied as a general-purpose server, such as a web server, that is coupled to the data center platform over a private network of the SSP. A client manager communicates with the administrative proxy, which performs a filtered or "virtualized administration" function that allows the client to manage its storage on the data center. However, this approach is vulnerable to security attacks and reliability problems, such as virus attacks, because of the general-purpose nature of the operating system and networking functions of the proxy server. Furthermore, this method also requires the SSP to frequently make changes to the administrative proxy as functionality enhancements and other evolutionary changes are made to the actual administrative interface on the storage servers by the storage server vendor(s) when the storage server software is upgraded.

Therefore, it is desirable to provide a system that separates common, physical administrative tasks from logical administrative tasks of a server. In addition, it is desirable to provide a system that enables a client manager with privileges to administer its own storage, but that also prevents that client from accessing/managing the common aspects of the server. It is also desirable to provide a system that enables a client manager to manage its storage on a SSP data center in a secure and reliable manner. Moreover, it is desirable to provide a system in which mapping and filtering of a virtualized administration function can be transparent, yet can be controlled independently and changed dynamically, for each virtual server.

SUMMARY OF THE INVENTION

The present invention comprises a system and method that enables a server, such as a filer, configured with a plurality of virtual servers, such as virtual filers, to provide two types of administrators for administering the filer. A physical filer (pfiler) administrator manages or administers common physical aspects of the filer platform, such as hardware resources and software objects that represent those resources. In contrast, a virtual filer (vfiler) administrator administers logical aspects of a vfiler, such as access control for logical storage resources allocated to the vfiler. Specifically, the novel system provides full administrative capability authority to the pfiler administrator to administer the filer platform, including the ability to create and administer vfilers, whereas only a subset of administrative capabilities is provided to each vfiler administrator to facilitate its administrative function on behalf of a client.

In accordance with a feature of the novel administrative system, a user interface (UI) mechanism is provided for "tagging" or associating capabilities with a vfiler, as well as distinguishing roles of the vfiler and pfiler administrators by, e.g., destination address of a request received at the filer. Another feature of the invention "virtualizes" administration of a vfiler by an external source using vfiler administrative operations in connection with predetermined protocols or through the use of a command line interpreter in the context of the vfiler. Such virtualized administration can incorporate dynamic mappings and customizations of the administrative operations and their required user permissions in order to filer, control and simplify the administrative interface. The resulting "virtualized" server is particularly suited for a storage service provider implementation.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 6 is a schematic block diagram illustrating a vfiler context data structure in accordance with the present invention.

DETAILED DESCRIPTION OF AN ILLUSTRATIVE EMBODIMENT

Figure 1:
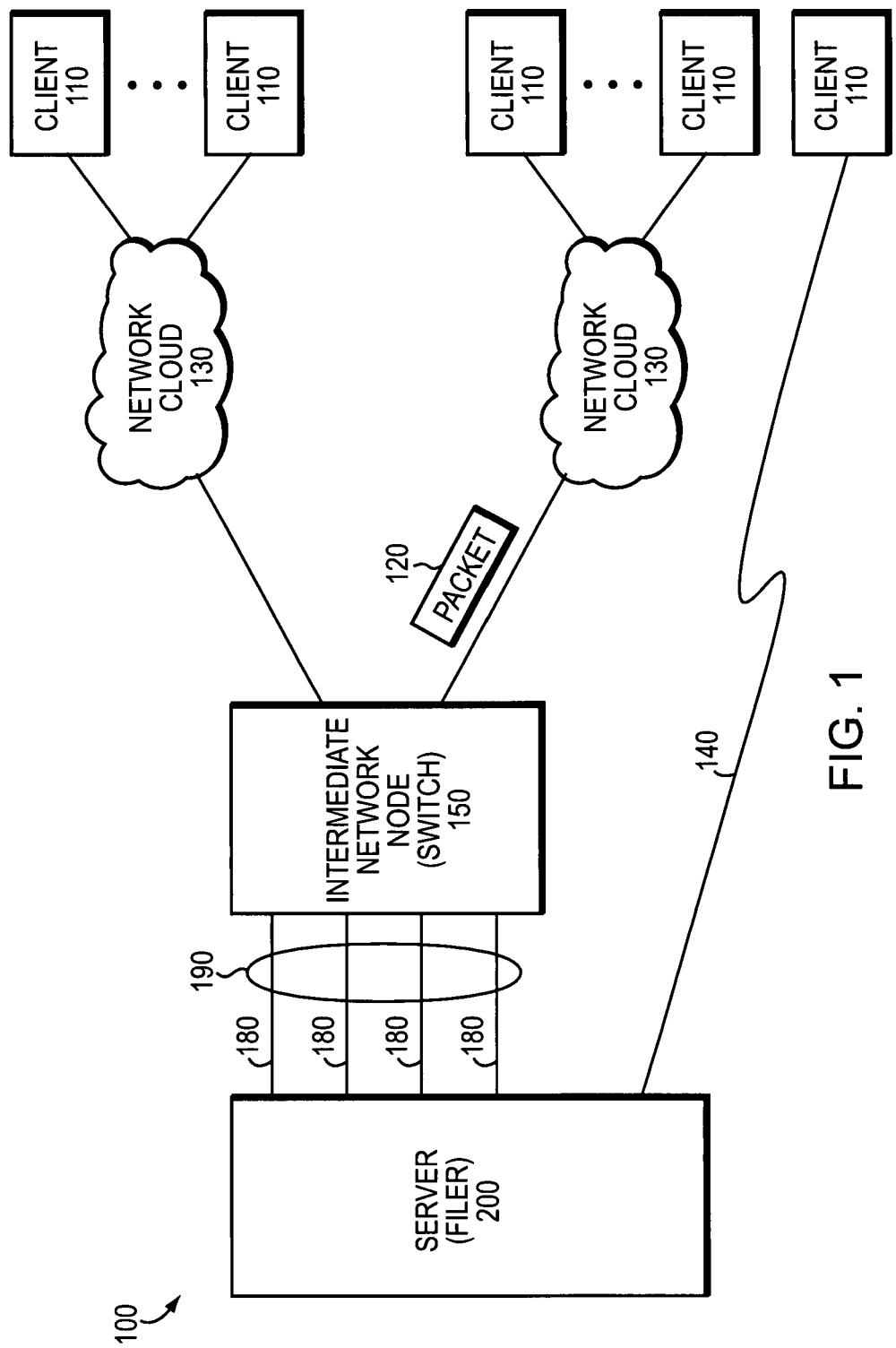
FIG. 1 is a schematic block diagram of a computer network including a plurality of clients and a server that may be advantageously used with the present invention.

FIG. 1 is a schematic block diagram of a computer network 100 including a plurality of clients 110 and a file server, such as a network storage appliance, that may be advantageously used with the present invention. The file server or filer 200 is a computer that provides file service relating to the organization of information on storage devices, such as disks. The clients 110 may be general-purpose computers configured to execute applications including file system protocols, such as the conventional Common Internet File System (CIFS) protocol. Moreover, the clients 110 may interact with the filer 200 in accordance with a client/server model of information delivery. That is, each client may request the services of the filer, and the filer may return the results of the services requested by the client, by exchanging packets 120 encapsulating, e.g., the CIFS protocol format over the network 100. It will be understood to those skilled in the art that the inventive technique described herein may apply to any server capable of providing a service to any client in accordance with various applications executing on the client.

The filer 200 may be coupled to an intermediate network node, such as a router or switch 150, over a plurality of physical links 180, each of which may comprise, e.g., a gigabit Ethernet link, a 100 base T Ethernet link, a 10 base T Ethernet link or any similar link. The switch 150 is further coupled to the clients 110 over network clouds 130 configured as, e.g., local area networks (LANs) or virtual LANs (VLANs). Alternatively, the filer may be connected directly to one or more clients over a communications link 140 comprising a point-to-point connection or a shared medium, such as a LAN.

Figure 2:
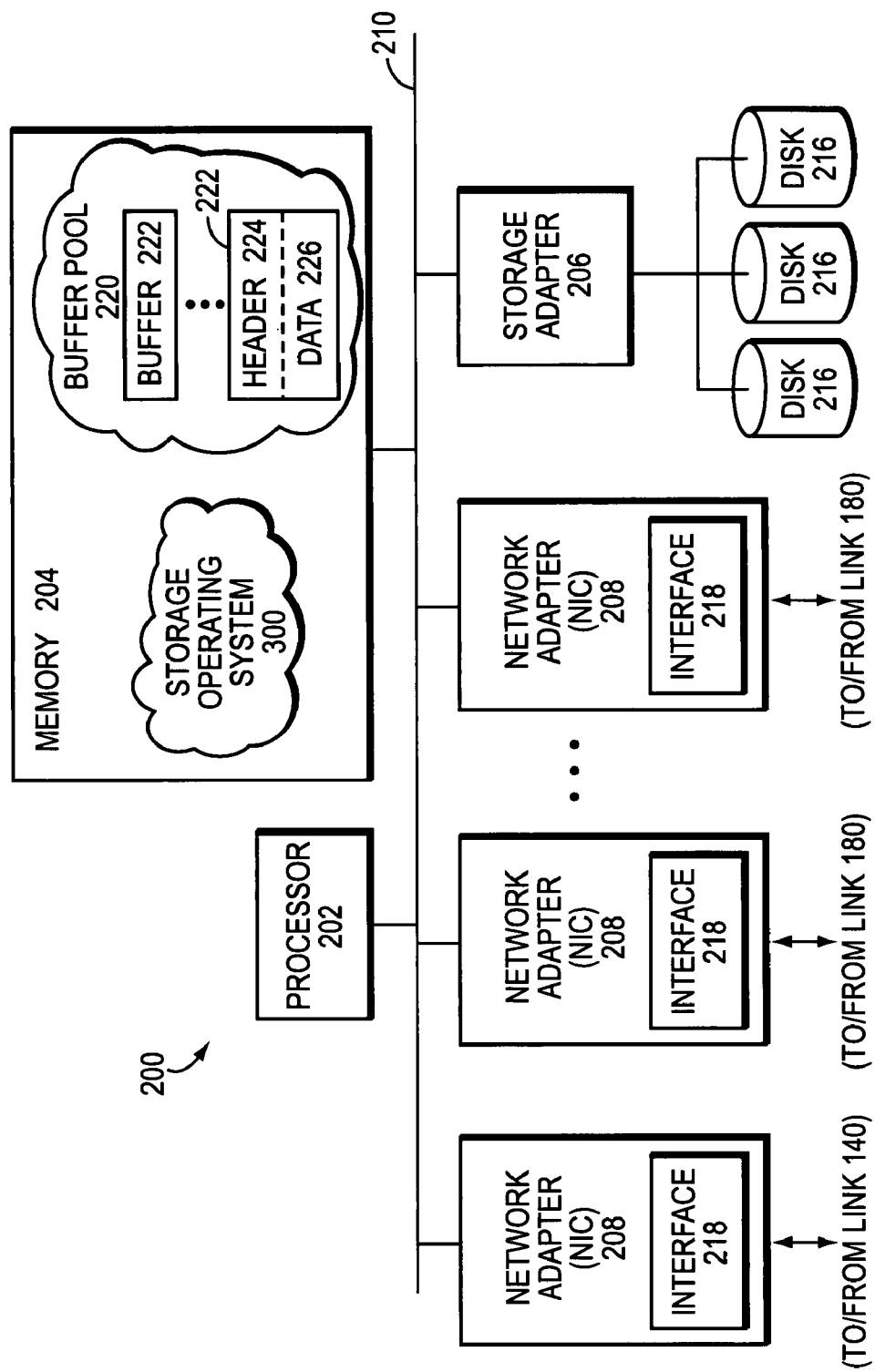
FIG. 2 is a schematic block diagram of a server, such as a network storage appliance or filer that may be advantageously used with the present invention.

FIG. 2 is a schematic block diagram of the filer 200 comprising a processor 202, a memory 204, a storage adapter 206 and one or more network adapters 208 interconnected by a system bus 210, which is preferably a conventional peripheral computer interconnect (PCI) bus 210. The filer also includes a storage operating system 300 that implements a file system to logically organize the information as a hierarchical structure of directories and files on disks 216 coupled to the storage adapter 206. In the illustrative embodiment described herein, the operating system 300 is preferably the NetApp® Data ONTAP™ operating system available from Network Appliance, Inc. that implements a Write Anywhere File Layout (WAFL) file system.

The memory 204 may be apportioned into various sections, one of which is a buffer pool 220 organized as a plurality of data buffers 222 for use by network drivers of the operating system 300. Each network driver is assigned a list of buffers 222 that is used to load incoming data requests received at interfaces 218 of the network adapter 208, as described herein. Other sections of the memory may be organized as storage locations that are addressable by the processor and adapters for storing software program code and data structures associated with the present invention. The processor and adapters may, in turn, comprise processing elements and/or logic circuitry configured to execute the software code and access the data structures. The storage operating system 300, portions of which are typically resident in memory and executed by the processing elements, functionally organizes the filer by, inter alia, invoking storage and network operations in support of the services implemented by the filer 200. It will be apparent to those skilled in the art that other processing and memory means, including various computer readable media, may be used for storing and executing program instructions pertaining to the inventive technique described herein.

The network adapter 208 may comprise a network interface card (NIC) having the mechanical, electrical and signaling circuitry needed to connect the filer 200 to the switch 150 over the physical links 180. In one embodiment, the physical links and interfaces may be organized as an aggregate or virtual interface (VIF) 190. Each NIC may include a single interface 218 such that, for a 4-link VIF, the filer includes 4 NICs 208. Alternatively, each NIC 208 may include 4 "quad port" interfaces 218, each of which is connected to a link 180 of the VIF 190. In another embodiment, the physical links and interfaces may be arranged as a de-aggregate or VLAN. Each interface 218 may be assigned one or more Internet Protocol (IP) addresses along with one media access control (MAC) address. However, when the physical interfaces 218 and their associated links 180 are aggregated as a single virtual interface 190, all of the physical interfaces respond to only one MAC address. That is, the physical interfaces 218 are organized into one virtual "pipe" having one logical interface that is assigned a common MAC address.

The storage adapter 206 cooperates with the storage operating system 300 executing on the filer to access information requested by the client, which information may be stored on any storage media, such as the disks 216. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 202 (or the adapter 206 itself) prior to being forwarded over the system bus 210 to the network adapter 208, where the information is formatted into a packet 120 and returned to the client 110.

Storage of information on the filer is preferably implemented as one or more storage "volumes" that comprise a cluster of physical storage disks 216, defining an overall logical arrangement of disk space. Each volume is generally associated with its own file system. To facilitate access to the disks 216, the storage operating system 300 implements a file system that logically organizes the information as a hierarchical structure of directories and files on the disks. Each "on-disk" file may be implemented as set of disk blocks configured to store information, such as data, whereas the directory may be implemented as a specially formatted file in which information about other files and directories are stored. As noted, the storage operating system is preferably the Data ONTAP operating system that implements a WAFL file system. However, it is expressly contemplated that any appropriate file system can be used, and as such, where the term "WAFL" is employed, it should be taken broadly to refer to any file system that is otherwise adaptable to the teachings of this invention.

Figure 3:
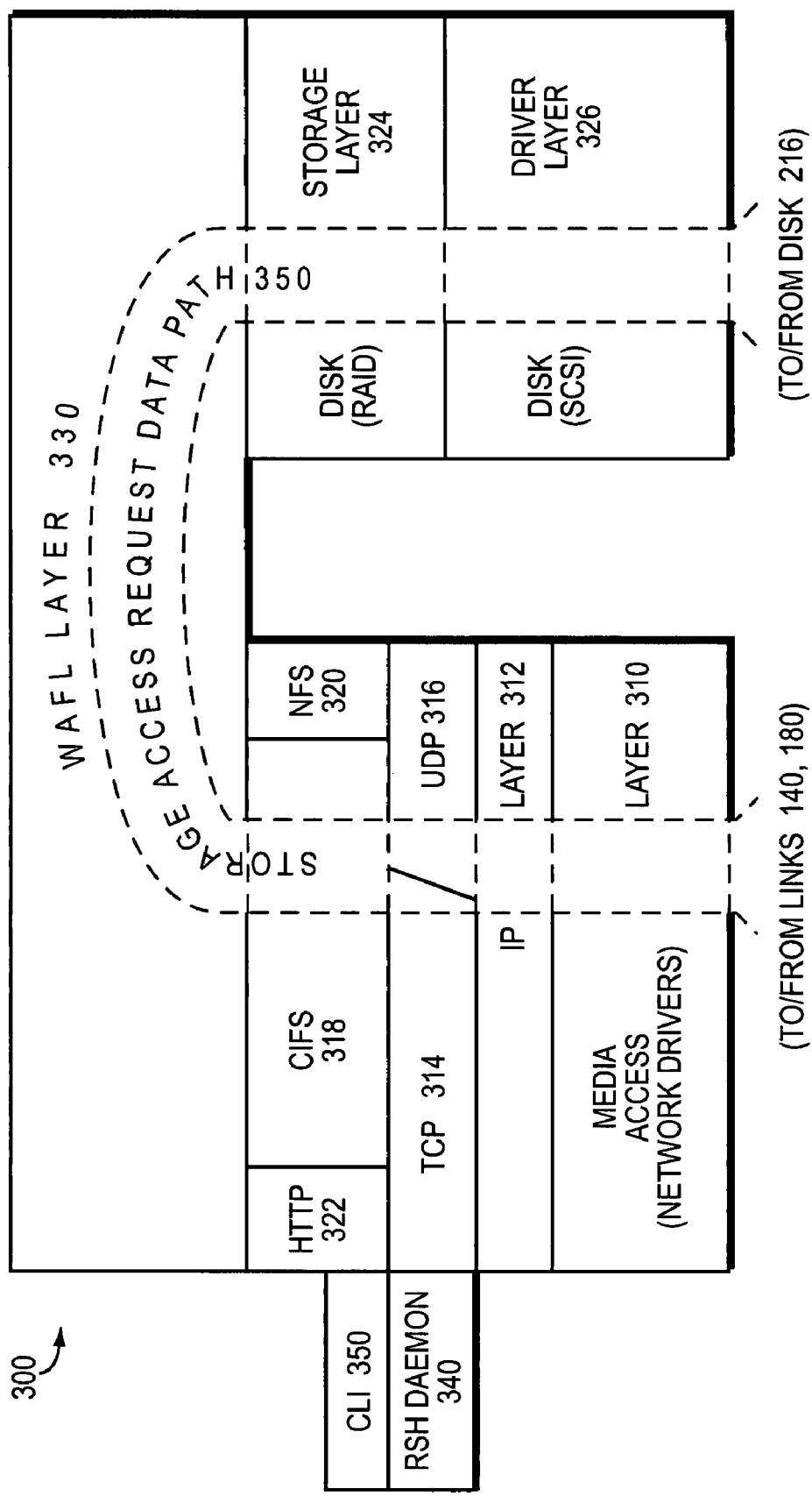
FIG. 3 is a schematic block diagram of a storage operating system that may be advantageously used with the present invention.

FIG. 3 is a schematic block diagram of the Data ONTAP operating system 300 that may be advantageously used with the present invention. The storage operating system comprises a series of software layers, including a media access layer 310 of network drivers (e.g., a gigabit Ethernet driver). The operating system further includes network protocol layers, such as the IP layer 312 and its supporting transport mechanisms, the Transport Control Protocol (TCP) layer 314 and the User Datagram Protocol (UDP) layer 316. A file system protocol layer provides multi-protocol data access and, to that end, includes support for the CIFS protocol 318, the Network File System (NFS) protocol 320 and the Hypertext Transfer Protocol (HTTP) protocol 322. The storage operating system 300 also includes a disk storage layer 324 that implements a disk storage protocol, such as a Redundant Array of Independent Disks (RAID) protocol, and a disk driver layer 326 that implements a disk access protocol such as, e.g., a Small Computer Systems Interface (SCSI) protocol.

Bridging the disk software layers with the network and file system protocol layers is a WAFL layer 330 that preferably implements the WAFL file system. The on-disk format representation of the WAFL file system is block-based using, e.g., 4 kilobyte (kB) blocks and using inodes to describe the files. An inode is a data structure, e.g., a 128-byte structure, which is used to store information, such as meta-data, about a file. The metadata contained in an inode may include, e.g., ownership of the file, access permission for the file, size of the file, file type, unit of storage associated with the file and location of the file on disk. The WAFL file system uses a file handle, i.e., an identifier that includes an inode number, to retrieve an inode from disk. The WAFL layer 330 also uses files to store meta-data describing the layout of its file system. These meta-data files include, among others, an inode file.

Operationally, a request from a client 110 is forwarded as, e.g., a conventional CIFS protocol packet 120 over the computer network 100 and onto a network adapter 208 of the filer 200. A network driver of the media access layer 310 cooperates with the network adapter to load the request packet into a data buffer 222 and marks the buffer with the name of the physical interface 218 over which the incoming request was received at the filer. Each buffer 222 includes a header 224 and a data portion 226, with the incoming packet being loaded into the data portion. The contents of the header are maintained by the filer and include (i) the type of buffer, (ii) various flags and (iii) the incoming interface marked by the filer. After being loaded with the incoming packet, the buffer 222 is essentially "pushed up" the network protocol stack and delivered to an appropriate application which services the requests by, e.g. fetching data stored on disks of the filer.

Specifically, the network driver 310 passes the buffer to the network protocol layers 312-314 and onto the CIFS layer 318 for additional processing prior to forwarding to the WAFL layer 330. The WAFL file system generates operations to load (retrieve) the requested data (and inode) from disk 216 if it is not resident "in core", i.e., in the memory 204. If the information is not in memory, the WAFL layer 330 indexes into the inode file using the inode number to access an appropriate entry and retrieve a logical volume block number (VBN). The WAFL layer then passes the logical VBN to the disk storage (RAID) layer 324, which maps that logical number to a disk block number and sends the latter to an appropriate driver (e.g., SCSI) of the disk driver layer 326. The disk driver accesses the disk block number from disk 216 and loads the requested data block(s) in memory 204 for processing by the filer. Upon servicing the request, the CIFS layer 318 allocates another (response) buffer 222 from the buffer pool 220 for the fetched data and further associates that response to the initial request. That is, the CIFS layer marks the response buffer with the physical interface associated with the incoming request.

As noted, the filer 200 is configured to provide file service to a plurality of clients 110 and, as a result, generally returns data responsive to requests issued by the clients. In order to enhance its responsiveness, the filer implements a "fast path" technique that essentially returns a response over the same physical interface 218 that was used to receive a request from the client. To invoke the fast path technique, the CIFS layer 318 asserts a fast path flag within the buffer header 224 and then passes the buffer "down" the protocol stack to the IP layer 312, which examines the state of that flag. Assertion of the fast path flag informs the IP layer that it does not have to perform route calculation for this particular response. Accordingly, the interface within the filer targeted to receive the response buffer is the incoming interface 218 over which the request was received. The buffer is forwarded to that interface and the requested data is then returned to the client 110 over the network 100.

It should be noted that the software "path" through the storage operating system layers described above needed to perform data storage access for the client request received at the filer may alternatively be implemented in hardware. That is, in an alternate embodiment of the invention, the storage access request data path 350 may be implemented as logic circuitry embodied within a field programmable gate array (FPGA) or an application specific integrated circuit (ASIC). This type of hardware implementation may increase the performance of the file service provided by filer 200 in response to a file system request packet 120 issued by client 110. Moreover, in another alternate embodiment of the invention, the processing elements of adapters 206, 208 may be configured to offload some or all of the packet processing and storage access operations, respectively, from processor 202, to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with storage applications described herein or with configurable functionality, which is configured for storage applications as described herein.

In addition, it will be understood to those skilled in the art that the inventive technique described herein may apply to any type of special-purpose (e.g., file serving appliance) or general-purpose computer, including a standalone computer or portion thereof, embodied as or including a storage system.

A server may be defined as a computer adapted to provide application service to one or more clients; in this context, a virtual server is an instance of the application service provided to a client. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The present invention relates to an architecture that provides the ability to create and maintain multiple instances of virtual servers, such as virtual filers (vfilers), within a single server, such as a filer. A vfiler is a logical partitioning of network and storage resources of the filer platform to establish an instance of a multi-protocol server. Each vfiler is maintained and executed entirely independent of other vfilers on the platform. To that end, dedicated filer resources, such as units of storage and network addresses of network interfaces, may be arbitrarily grouped and "hard" partitioned to establish security domains within the filer. Yet common filer resources, such as a storage operating system and a file system, may be shared among the vfilers.

Specifically, each vfiler is allocated a certain amount, i.e., a subset, of dedicated and distinct units of storage resources, and one or more dedicated and distinct network addresses. Each vfiler is also allowed shared access to the common file system on behalf of its client. Therefore, interpretations of a security object associated with, e.g., a client accessing the common file system may vary among vfilers. To address this, each vfiler is provided a vfiler context data structure (hereinafter "vfiler context") containing, among other things, references (i.e., pointers) to a set of configuration information that allows the vfiler to authenticate users, perform security operations and export/share data for all supported protocols. In addition, each vfiler is provided a set of management interfaces, including both a command line interpreter (CLI) and remote procedure (RPC)-style programming interface.

Figure 4:
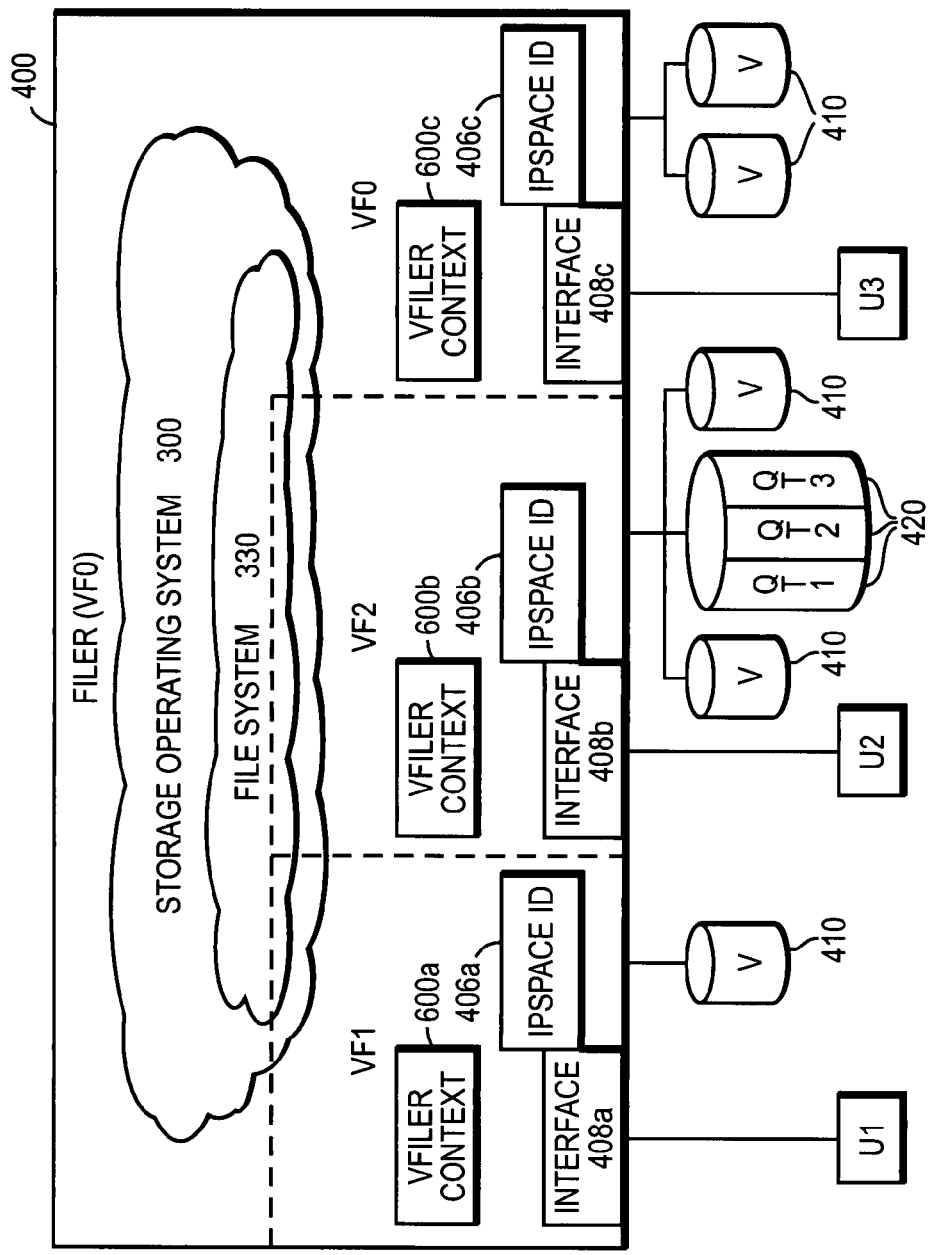
FIG. 4 is a schematic diagram of an embodiment of a filer having a plurality of virtual filers (vfilers) in accordance with the present invention.

FIG. 4 is a schematic diagram of an embodiment of a filer platform 400 that may be advantageously used with the present invention. The filer may function as a storage service provider (SSP) to serve ("host") data storage applications for multiple users or clients within the filer platform or "data center". The SSP data center is organized into a plurality of logical vfilers VF0, VF1 and VF2, each of which may be associated with a client environment. Each vfiler may be embodied as a server that, from the perspective of a client, is separate and distinct from the other vfilers. Each client environment may have an independent private internal network associated with its vfiler; for example, VF1 is coupled to a first client environment U1 and VF2 is coupled to a second client environment U2. This allows the vfiler to perform storage operations using the client's unified view, i.e., "namespace", of network resources.

Vfiler 0 (VF0) is referred to as the default vfiler that is created at initialization upon booting of the physical filer. VF0 is the only vfiler embodied in the filer if no other vfilers are created. When multiple vfilers are defined, those resources that are not part of any of the vfilers are "owned" by VF0; therefore, VF0 is the default repository of physical filer resources. The default VF0 is associated with the physical filer and is configured to execute protocol services associated with the filer.

Each vfiler VF0-VF2 is configured with one or more network addresses, such as Internet Protocol (IP) addresses, that may be assigned to one or more network interfaces 408a-c. In this context, the term network interface refers to an IP addressable interface, including a "physical" NIC and a "soft" NIC, such as a VIF, a VLAN and an emulated LAN (ELAN). A single NIC can support a plurality of IP addresses and, with such a configuration, multiple vfilers can effectively share a single NIC, if desired.

Each interface of the filer is further assigned an IPspace identifier (ID) 406a-c that essentially "binds" the interface to an IPspace. An IPspace refers to each distinct IP address space in which the filer and its storage operating system participate. A single filer can support multiple IPspaces. Each vfiler is associated with an IP address space and, thus, belongs to one IPspace. The IP addresses within each IPspace must be unique. The IPspace is further described in copending and commonly-assigned U.S. patent application Ser. No. 10/035,666 titled, Technique for Enabling Multiple Virtual Filers on a Single Filer to Participate in Multiple Address Spaces with Overlapping Network Addresses, filed on Dec. 28, 2001, now issued as U.S. Pat. No. 6,895,429 on May 17, 2005, which is hereby incorporated by reference as though fully set forth herein.

The units of storage resources allocated to each vfiler include a volume or subvolume (qtree). A volume (V) 410 is a unit of storage comprising a file system or hierarchy of directories and files. A qtree, QT1-3 420, is a special directory similar to a minivolume (mini-file system) or subdivision of a volume that has the property of being able to identify itself within a file system by, e.g., a qtree identifier (qtreeid) stored within an inode of a file. The vfiler architecture provides efficient utilization and management of these storage resources, including creation, assignment and mapping of the resources to and among the vfilers.

As noted, there are many tasks involved in managing or administering a data center, such as a filer platform having a plurality of vfilers configured to host data storage applications for different clients. Each client wants to maintain the privacy of its data that is accessible over its internal network coupled to a vfiler, but also wants the assistance of a system manager when administering the system aspects of the data center. In particular, there is a need for one administrator to manage/administer the common "physical" aspects of a filer platform, while enabling each client to administer the specific "logical" aspects of its associated vfiler.

Figure 5:
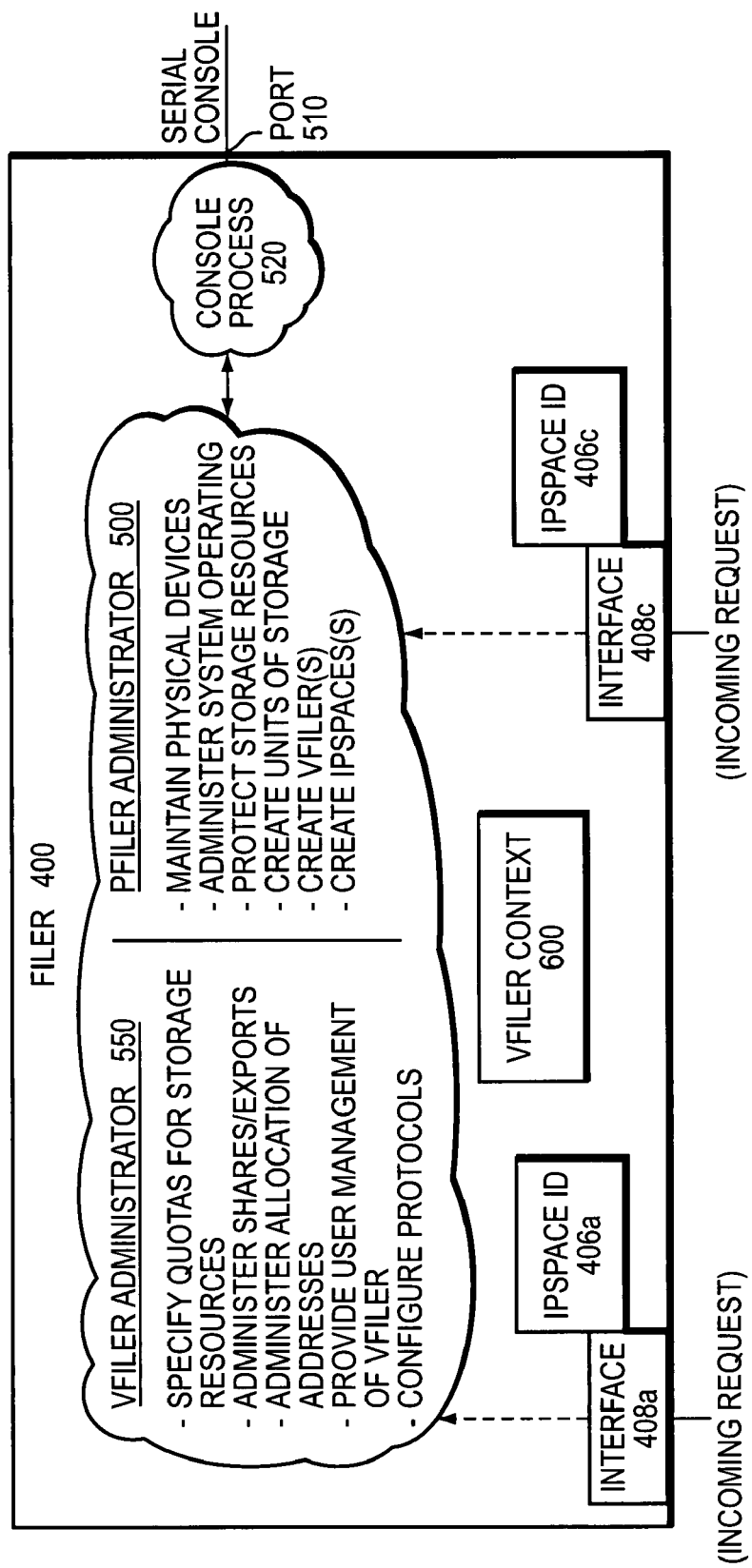
FIG. 5 a schematic block diagram illustrating capabilities and functions of a pfiler administrator and a vfiler administrator in accordance with the present invention.

The present invention comprises a system and method that enables a server, such as a filer, configured with a plurality of virtual servers, such as vfilers, to provide two types of administrators for administering the filer: a physical filer (pfiler) administrator and a virtual filer (vfiler) administrator. The pfiler administrator manages or administers common physical aspects of the filer, such as network and storage hardware as well as operating system software of the filer platform. In contrast, the vfiler administrator administers logical or virtual aspects of a vfiler, such as network addresses and units of storage resources. Specifically, the novel system provides full administrative capability authority to the pfiler administrator to administer the filer platform, including the ability to create and administer vfilers. On the other hand, only a subset of administrative capabilities is provided to each vfiler administrator to facilitate its administrative function, such as the management of resources on behalf of a client. Note that the vfiler administrator for one vfiler has no access to other vfilers on the physical filer platform. Also note that the pfiler administrator can dynamically modify the subset of administrative capabilities, on a per-vfiler basis, to suit the differing and specific needs of each vfiler FIG. 5 is a schematic block diagram illustrating various capabilities and functions of a pfiler administrator and a vfiler administrator. In accordance with a feature of the novel administrative system, a user interface (UI) mechanism is provided for "tagging" or associating capabilities with a vfiler, as well as distinguishing roles of the vfiler and pfiler administrators by, e.g., destination address of a request received at the filer. The pfiler and vfiler administrators are essentially "roles" designated by the storage operating system, wherein each role is defined by a set of capabilities. The roles of the vfiler and pfiler administrators are preferably distinguished by the destination address of an incoming request received at a network interface (that is bound to an IPspace) of the filer. For example, if an administrator is allowed to access a destination IP address assigned to network interface 408c of the default vfiler VF0, then the administrator assumes the role of the pfiler administrator when sending an administrative request to that address. On the other hand if the address is assigned to interface 408a belonging to vfiler VF1, then the administrator assumes the role of a vfiler administrator which, e.g., may be the system administrator for client environment U1.

As described herein, the assumed role of an administrator manifests as a set of administrative operations available to that administrator and implemented through requests made via a CLI and other standardized (e.g. SNMP) or proprietary protocols. The administrative role, as indicated by the vfiler context currently executing on the filer, is "carried along" (associated) with every process executing on the filer. Processes, such as an authentication process, "spawned" for each instance of the current vfiler context 600 carry out the capabilities associated with the administrative role. It should be noted that execution of a spawned process of a vfiler context may alternate between administrative roles. That is, a given process may, for one instance of an instruction, execute in a pfiler administrative role and, a few instructions later, the same process may execute in a vfiler administrative role.

In the illustrative embodiment, there is no console for a vfiler, although there is an RS232 serial console port 510 on the filer. The console port 510 enables "local" CLI access to the physical and virtual aspects of the filer by a user (U3) functioning as the pfiler administrator (hereinafter the "pfiler administrator 500"). In particular, the pfiler administrator 500 communicates with a console process 520 of the serial port 510. The console port and process are part of the UI mechanism of the storage operating system 300 that cooperate to perform initialization functions and provide a CLI in the context of VF0. The pfiler administrator can also access VF0 using a conventional Remote SHell (RSH), Telnet or other (e.g., SSH) protocol in accordance with an incoming request directed to a network interface 408c having an IP address owned by VF0.

Moreover, a user functioning as a vfiler administrator (hereinafter the "vfiler administrator 550") can manage its vfiler resources through the UI mechanism of the filer's operating system. As described herein, this UI mechanism may be invoked by the vfiler administrator either over the network using, e.g., RSH or other similar network management protocols, such as Telnet or the Simple Network Management Protocol (SNMP), or by requesting the pfiler administrator to perform the vfiler administrative function. Using the serial console port 510, the pfiler administrator can then issue a CLI command that executes in the context of a vfiler currently operating on the filer to thereby enable the pfiler administrator to temporarily become the vfiler administrator for that vfiler for purposes of that command execution.

Previous SSP implementations have employed a special server configured as an administrator proxy to enable a client manager to manage its storage. The client manager communicates with the administrator proxy, which then accesses the data center platform over a private network of the SSP. The administrator proxy effectively performs the filtered or virtualized administration function on a server that is separate and apart from the data center platform. In contrast, this virtualization function is "built into" the vfiler architecture, thereby relieving the SSP of this responsibility. That is, a filer platform 400 embodied as a SSP does not have to provide a separate "proxy" server to perform virtualized administration function. The integrated administrative feature of the vfiler architecture also enhances security and privacy because it obviates networking issues such as routing, associated with a separate server function. This integrated feature also relieves the SSP of the responsibility of making changes to the administrative proxy to match changes in the administrative interface of a filer with changing versions of the filer software.

Specifically, commands executed in the context of a vfiler are filtered or "virtualized". For example, if a vfiler administrator 550 attempts to display available space on storage resources, the results of that attempt will reflect only the space available on those volumes explicitly owned by the vfiler. In addition, if the vfiler administrator attempts to set a quota on storage resources that it doesn't own and that affects another vfiler's storage resources, that attempt will fail. Here, commands issued by a vfiler are subject to vfiler boundary checking as described in U.S. patent Ser. No. 10/035,664, titled Architecture for Creating and Maintaining Virtual Filers on a Filer, filed on Dec. 28, 2001, now issued as U.S. Pat. No. 7,360,034, issued on Apr. 15, 2008, which application is hereby incorporated by reference as though fully set forth herein. Furthermore, checking operations are performed at the level of options such that only certain options are settable for a vfiler and if an attempt is made to set a global, system wide option, that attempt will fail.

According to a feature of the invention, the UI mechanism allows "tagging" or associating of capabilities and attributes with a vfiler. Physical filer attributes, such as backup and virus scanning operations, are common filer attributes that are not part of the logical attributes of a vfiler. These backup and scanning operations can be performed on the filer platform as a centralized management function by the pfiler administrator 500 associated with VF0; however, backup and virus scanning can also be performed by a vfiler administrator if desired. However, both the pfiler and vfiler administrators may have the responsibility of administering options associated with the capabilities described herein.

The vfiler administrator is preferably provided a subset of administrative capabilities given to the pfiler administrator to allow the vfiler administrator to administer logical aspects of a vfiler on behalf of a client. For example, the vfiler administrator is responsible for operating on the contents of a vfiler context 600 associated with its vfiler, and administering data contained in the units of storage and accessed by the network address resources allocated to its vfiler. In particular, the vfiler administrator can specify quotas for its storage resources and administer shares/exports available to its vfiler.

The vfiler administrator can also provide user management for its vfiler, including management of protocols available to users and/or groups and administrative users of the vfiler. Similarly, the vfiler administrator can configure protocols, such as network information system (NIS) and domain name service (DNS) protocols, along with other domain-related functions. A restricted CLI command set is available to the vfiler administrator, as are per vfiler administrative protocols. These latter protocols include, for example, SNMP, RSH, Telnet, HTTP, SSH, SSL and other RPC-like protocols, each of which can optionally be made available to the vfiler administrator with restricted access to only to vfiler resources on the physical filer.

On the other hand, the pfiler administrator 500 has full administrative capability authority to administer the filer which, in the illustrative embodiment, pertains to management of the common, shared aspects, e.g., the physical hardware and operating system software attributes, of the filer platform. To that end, the pfiler administrator is responsible for maintaining physical devices attached to the filer, such as network adapters and interfaces, as well as storage adapters and devices (tape and disk). The pfiler administrator is also responsible for administering, e.g., configuring and initiating, system operations, such as virus scanning and other filer-wide functions pertaining to the physical platform. In addition, the pfiler administrator is responsible for protecting the underlying storage resources and their contents. For example, the pfiler administrator would typically be responsible for backup operations on the filer.

Another capability of the pfiler administrator is the creation of units of storage resources, such as qtrees and volumes. A volume is typically considered more closely associated with the hardware aspects of the storage resources as opposed to qtrees, which are considered more logical lower-level aspects of the resources. Specific functions available to the pfiler administrator with respect to these units of storage include the ability to create, destroy, migrate and expand the units on a physical filer. If a vfiler has a unit of storage equal to an entire volume, it may be appropriate to allow the vfiler administrator to conduct certain physical filer administrative functions, such as volume management. However if a volume shares disk space or qtrees that are owned by multiple vfilers, then the pfiler administrator performs the physical filer administrative functions.

Other capabilities of the pfiler administrator include creation (and administration) of the vfilers, along with the creation (and administration) of IPspaces associated with those vfilers, and the assignment (binding) of IP addresses in the various IPspaces to network interfaces. As noted, when a filer is installed, a default set of resources (e.g., all of the resources coupled to the filer) initially belongs to the default vfiler VF0. These resources include all storage and networking resources. The basic command used to control a vfiler is a vfiler CLI command, an example of which is a vfiler create command used to create a vfiler. That is, if it is desired to create another vfiler, the pfiler administrator may issue a vfiler create command to create a vfiler context. Creation of a vfiler includes creation of a vfiler context and allocation of dedicated resources (such as network addresses and units of storage) to each created vfiler.

An example of a method for creating a vfiler involves use of the following CLI command of the UI mechanism associated with the operating system:

vfiler create xyz [-s Ipspace-name] [-i IP address(s)] [/vol/vol2] [ivol/vol3/qt1]

wherein xyz is the name of the created vfiler, -s Ipspace-name is the name of the ipspace to which the vfiler belongs and -i IP address(s) denotes a particular IP address or series of IP addresses of the vfiler. In addition, the notation /vol/vol2 is a first path descriptor to a first unit of storage, whereas the notation /vol/vol3/qt1 is a second path descriptor to a second unit of storage. Notably, the vfiler create CLI command creates a vfiler context 600*a-b* for each created vfiler VF1-VF2. A vfiler context 600*c* is also created for the default vfiler VF0 upon initial installation (i.e., booting) of the filer 400.

Each instance of a created vfiler is described by "external" and "internal" configuration. External configuration describes the resources assigned to a vfiler (e.g., one or more IP addresses and one or more units of storage, such as an entire volume or a qtree on a volume) and capabilities available to a vfiler (e.g., protocols allowed to run on the vfiler). Internal configuration (i.e., internal to the vfiler) controls operation of various protocol modules or "vfiler options" associated with the vfiler. Examples of such options include whether a NIS server is to be used with the vfiler and whether a particular protocol, such as NFS, uses TCP or UDP as its underlying transport. The external configuration information is preferably stored "on-disk" in a global registry of the physical filer (which is typically stored on the root volume of the filer), whereas the internal configuration is stored in a private registry in the storage assigned to the vfiler.

FIG. 6 is a schematic block diagram illustrating an in core representation of a vfiler context (hereinafter generally designated vfiler context 600) containing the internal and external configuration information or "state" needed to establish an instance of a multi-protocol server. Multiple instances of these contexts provide the basis for the vfiler architecture. The vfiler context 600 includes fields for holding a name 602 of the vfiler and a universally unique identifier (UUID 604) that is created with the vfiler context. The UUID may comprise, e.g., the current time of day and a medium access control (MAC) address associated with the vfiler. A vfiler list field 606 contains a list of vfilers on the filer platform and an IPspace indicator (ID) field 608 holds the IPspace ID of the vfiler.

According to the vfiler architecture, hardware resources, such as storage and network devices, are not directly assigned to the vfilers. Instead, software objects representing (in full generality) only a portion of the capabilities of these hardware devices are assigned to the vfilers. These software ("soft") objects correspond only to a "dynamically adjustable" portion of a hardware resource. The advantage of using soft objects for assignment to a vfiler is total flexibility in allocating, adding, moving and removing complete or portions of hardware resources between vfilers on a physical filer. These operations can be accomplished very quickly using, e.g., a simple short-running console command as opposed to a complex, long-running procedure of re-configuring or copying hardware objects between hardware partitioning based virtual servers.

Figure 7:
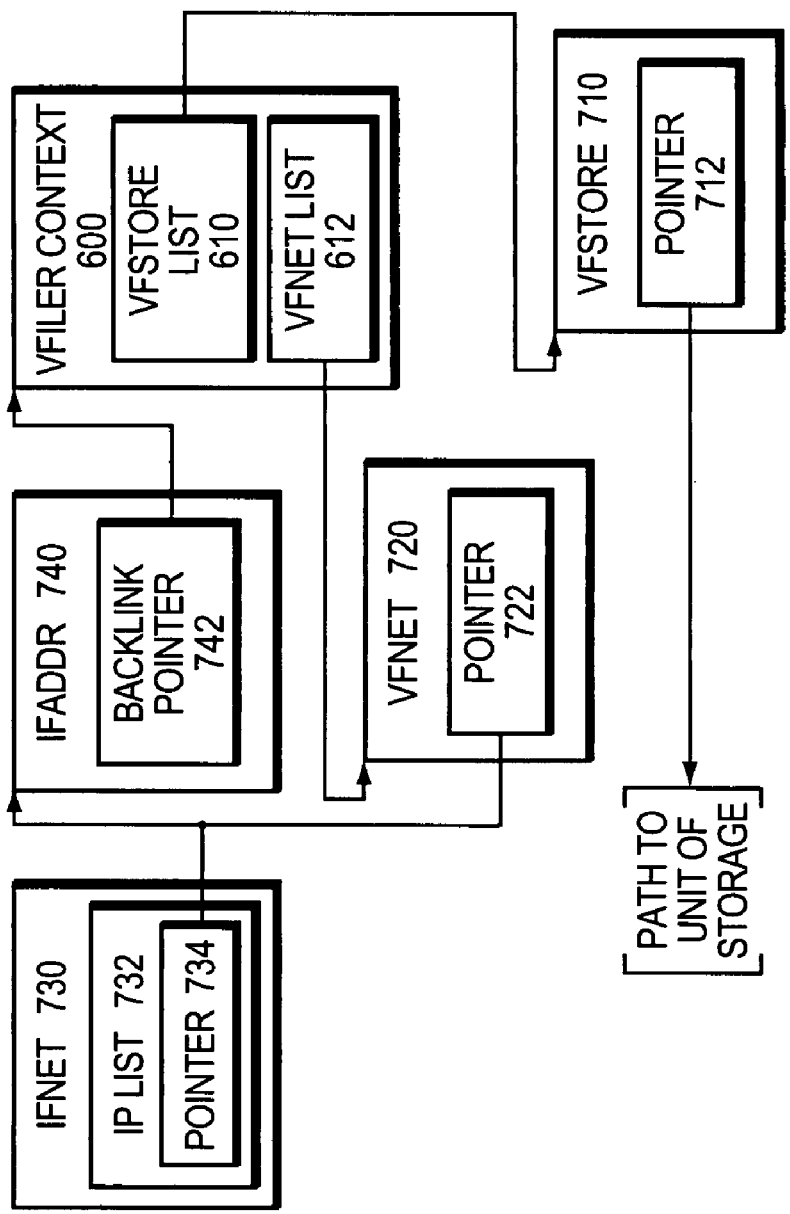
FIG. 7 is a schematic block diagram illustrating soft object data structures that may be advantageously used with the present invention.

Therefore, other fields of the vfiler context structure 600 hold a list 610 of virtual filer storage (vfstore) structures (soft objects) and a list 612 of virtual filer network (vfnet) soft objects. FIG. 7 is a schematic block diagram illustrating soft object data structures that may be advantageously used with the present invention. In particular, the vfstore list 610 comprises pointers to vfstore soft objects 710, each of which has a pointer 712 that references a path to a unit of storage resource, such as a qtree or volume, allocated to the vfiler. This allows, e.g., a volume consisting of multiple qtrees to be effectively shared between vfilers. A hash table (not shown) is also provided that "maps" each qtree or volume back to a vfiler context 600 (and thus a vfstore 710). In the illustrative embodiment, the vfstore object is hashed, but it refers to its owning vfiler.

The vfnet list 612 comprises pointers to vfnet soft objects 720, each of which has a pointer 722 that references an interface address (ifaddr) data structure 740 representing an IP address assigned to the vfiler. Each vfnet object 720 represents a "floating" capability that may be assigned to any network interface, e.g., a NIC, when an IP address is assigned to that NIC. If multiple IP addresses are assigned to the NIC, the capabilities of the NIC are effectively shared between multiple vfnet objects 720 and, thus, potentially different vfilers. If only a single IP address is associated with an interface (as represented by an interface network (ifnet) data structure 730), only one vfnet object 720, and therefore only one vfiler, uses the capabilities of the NIC.

Resource mapping is defined as the mapping between soft objects that represent assigned resources of a vfiler (e.g., vfstore and vfnet objects) to portions of hardware resources, such as a qtree/volume and an ifnet structure. The vfstore and vfnet soft objects thus provide a level of indirection that represents the dynamically adjustable portions of capabilities of these hardware resources. That is, these soft objects are "linked" to other software objects (data structures) representative of the hardware resources in a manner that enables flexibility when "logically" reassigning those network and storage resources by, e.g., changing pointers of the objects. Such flexibility allows logical establishment of vfiler configuration changes at the file system level, as opposed to physical establishment by, e.g., manually rearranging the network and storage hardware resources.

For example, an ifnet structure 730 includes an IP list field 732 that contains a list of IP addresses assigned to a network interface. The list 732, in turn, includes pointers 734 that reference appropriate ifaddr data structures 740 associated with those IP addresses. As noted, each vfnet object 720 may contain a pointer 722 to an ifaddr structure 740 (if the corresponding IP address is configured on an ifnet structure 730) or may contain a null value (if the address is not configured). Each ifaddr structure 740 also contains a back link pointer 742 to the vfiler context 600 (and therefore to a corresponding vfnet object 720).

Similarly, each vfstore object 710 has a pointer 712 to a path of a unit of storage, if the storage resource is online. In the illustrative embodiment, the WAFL file system 330 maintains information relating to the availability and scope of units of storage, such as qtrees and volumes. System calls are provided to query the file system with a path and, in response, receive a storage identifier tuple (e.g., fsid, qtreeid) that indicates the volume and qtree to which the path belongs.

Resource mapping in the vfiler architecture further enables efficient network and storage management with respect to, e.g., migration (assignment) of network and storage resources among vfilers. Network management refers to the set of data structures and algorithms that maintain the resource mapping between vfilers and their network resources as dynamic changes are made to the assignment of these resources and other changes on the filer platform. Storage management, on the other hand, refers to the set of data structures and algorithms that maintain the resource mapping between vfilers and their storage resources as dynamic changes are made to the assignment of these resources and other changes on the platform. Assignment changes include the addition, movement and removal of resources between vfilers. Other system changes include the creation of new NICs (VIFs and VLANs, or new devices) or the addition/on-lining/off-lining of storage volumes.

Network and storage management also includes the tasks performed on networking and storage objects when changes are made to the assignments of resources between vfilers. For example, TCP/IP connections and routing associated with an IP address must be reinitialized when the vfiler assignment of an IP address changes. Similarly, disk input/output operations that are in progress on a qtree or volume must be handled appropriately, and quotas must be reinitialized when the vfiler assignment of a storage unit changes.

A feature of the vfiler architecture is that each vfiler is associated with a unique and distinct security domain from the perspective of a client. In addition, each vfiler shares access to a common file system (e.g., the WAFL file system). Accordingly, interpretations of the security object associated with, e.g., a client accessing the common file system may vary among vfilers because each vfiler is associated with its own security domain. To address this, each vfiler context further includes information pertaining to the security domain of the vfiler to thereby enable controlled access to allocated and shared resources of the vfiler. Specifically, each vfiler context 600 has a pointer to /etc/passwd and /etc/group files 616 containing a user ID and group ID associated with each user password. Additionally, each vfiler context includes its own set of local Windows users and groups, together with network connections and other mechanisms necessary for authentication in a Windows environment.

Because of the multi-protocol nature of the storage operating system, a situation may arise where an NT user (Windows client) may attempt to access a file having UNIXstyle security (or vice versa, where a UNIX user/client may access a file having NT-style security). The vfiler architecture further includes a multi-protocol feature that supports multiple different clients having different types of security, and the ability to map those different client security types according to the security type stored in the file system. In particular, the WAFL file system 330 implements a multi-protocol mapping procedure to determine whether a client can access a requested resource/file. This mapping procedure may involve the use of a security controller associated with the security style of the resource to perform lookup operations into a security database to resolve the identity of the client/user. The vfiler context 600 implements this feature by providing a pointer that references a multi-protocol mapping library file 618 that enables translation of permission checking attributes from one protocol to another (e.g., NFS to NT security).

Each vfiler context 600 further includes a plurality of "module" data structures that includes all information (such as global variables) needed for an instance of a particular protocol or subsystem. For example, a CIFS module data structure 620 contains all information needed for an instance of the CIFS protocol, including information about contacting a domain controller 622, active sessions 624 for the protocol and various control blocks 625 associated with the CIFS protocol. Information pertaining to a security domain 626 is also provided to enable NT-type security for a CIFS request. The security information includes a security identifier comprising a domain portion and a relative ID (RID) portion, the latter RID being similar to the user ID of UNIX security. Each CIFS module 620 also contains a process ID (PID 628) of the CIFS authentication process that enables the CIFS layer to send an authentication request to the correct CIFS authentication process.

There is a similar "per-module" data structure for each of the protocols and subsystems associated with a vfiler including, but not limited to, the HTTP protocol 630, the RSH protocol 640, Telnet protocol 650, NIS subsystem 660, DNS subsystem 670 and registry 680. The NIS subsystem or "yellow pages" is a service locator for the NFS protocol that is implemented as a distributed database storing security information, such as user and group IDs associated with each user password. The NIS subsystem module 660 includes information for contacting a NIS controller when access to the distributed security database is required (using, e.g., the /etc/passwd and /etc/group information stored in files 616). The DNS subsystem facilitates resolution of a DNS name to a corresponding IP address.

The registry is a repository for configuration information pertaining to the hardware, software and users of the filer (and each vfiler). Each vfiler has its own per-vfiler registry, which is the only registry space "visible" when running in a per-vfiler context.

All per-vfiler options and certain configuration data are stored in this per-vfiler registry. Other per-vfiler configuration information is stored in the /etc store associated with each vfiler. For example, configuration information that a vfiler administrator may need to access (such as a passwd file) is stored in the /etc directory off the root of the vfiler's volume.

Once the vfiler context 600 and its associated per-module data structures are created, the registry in the root of the root volume (owned by VF0) is updated with special entries containing the configuration information specified in the vfiler create command. The root volume is a special volume from which the filer boots. The root volume contains configuration files for the filer; these files are stored in a directory in the root of the root volume. Specifically, the special entries in the registry contain information about the configuration of each vfiler, including the storage paths, network addresses, UUID, etc.

When the filer boots, a vfiler discovery process (part of the boot process) interrogates the registry to determine if any vfilers have been created. If so, the discovery process retrieves the contents of the special entries within the registry and configures the in core memory structures (e.g., the vfiler context and per-module data structures) as if that logic were created in response to a vfiler create command. Thereafter, when executing code (e.g., in the CIFS layer) that specifies, e.g., contacting a domain controller, the code refers to the per-module instance of the CIFS protocol within the current vfiler context to acquire the domain controller contact information. Also, when the vfiler initializes, a set of initialization routines are executed to allocate memory locations, set variables to known values and create processes with the appropriate vfiler ID.

Each vfiler context 600 also includes a pointer that references an administrative mapping library file layer 619 that enables various types of mapping of administrative operations. These types of mapping include:

(i) mapping of administrative operations executed in a pfiler context to a vfiler context—similar to a "vfiler run" command and "pass-through" registry namespace (described below). Another example includes mapping of administrative credentials, i.e., the "backup" administrator of a pfiler should be mapped to the "backup" administrator of a vfiler, but should not be mapped to the "root" administrator of a vfiler;

(ii) filtering of vfiler administrative operations, i.e., allowing a vfiler administrator to execute a subset of administrative operations. Such filtering can be modified dynamically, and is per-vfiler; and (iii) in an alternate embodiment, mapping of vfiler administrative operations between vfilers.

A pfiler administrator 500 can issue the command vfiler run to operate in the context of a vfiler and temporarily assume the role of the vfiler administrator for that vfiler. For example, to set an option for a particular vfiler, the pfiler administrator 500 can issue a command such as:

vfiler run xyz options nfs.tcp.enable off

This command sets the nfs.tcp.enable option to an off state for vfiler xyz. This implementation detail of the pfiler administrator is notable in that it allows the pfiler administrator a level of access into a vfiler even though the pfiler administrator does not have access to the internal network of a client coupled to the vfiler.

Another vfiler CLI command is an enable/disable command having an argument such as, e.g., protocol type. The notation for this particular command is:

vfiler enable/disable xyz, proto=CIFS

This command allows an administrator to enable or disable certain protocols for execution on the vfiler. For example, assume a CIFS request is received at vfiler xyz and the CIFS protocol has been explicitly disabled on that vfiler. Once the request traverses the protocol stack to the CIFS layer, it is dropped because that service is disabled on the vfiler. Note that the difference between the stop and disable commands is that the stop command terminates incoming requests at the network interface level of the vfiler, whereas the disable command terminates incoming requests at the granularity of the protocol layer.

Other vfiler CLI commands include vfiler stop and start commands. Examples of the stop and start commands are:

vfiler stop xyz
vfiler start xyz

These commands are useful when a failure is suspected in the filer or for fault isolation, where the stop command may be issued to discard incoming requests directed to the specified virtual filer. Thereafter, the start command may be invoked to allow processing of subsequent incoming requests at the filer. These commands may also be useful in the event of a suspected "denial of service" attack against the vfiler.

The pfiler administrator 500 can further configure IPspaces (namespaces) using novel IPspace CLI commands. The IPspace configuration of a system is persistent and preferably implemented via the registry. These CLI commands include:

IPspace create<IPspacename>
IPspace assign<IPspacename><ifname>
IPspace destroy<IPspacename>
IPspace list;
IPspace Help The IPspace create command creates a new IP namespace. Upon creating new namespaces, network interfaces may be moved among IPspaces using the IPspace assign command. Only interfaces that can be assigned an IP address can form the argument of the assign command. An interface can be reassigned to a different IPspace only if there is no address associated with the interface. The ifname argument of the IPspace assign command enables the assignment of an IPspace to an ifnet data structure 730. The IPspace destroy command can destroy an IPspace only if no vfiler or interface is assigned to it. Note that the command vfiler create may take the name of an IPspace as an optional argument.

As noted, a vfiler administrator may access its vfiler over a private network in accordance with an incoming request directed to an IP address of a network interface (e.g., interface 408a) that belongs to a vfiler other than VF0. This incoming request then executes in the context of that vfiler. When a command associated with the incoming requests executes, it refers to the data and variable associated with a current vfiler context.

For example, assume an incoming request (such as NFS, CIFS, HTTP or TelNet packet) is received at a network interface of the filer and is thereafter directed to the proper vfiler based on the destination IP address of the request and the IPspace ID of the interface. Specifically, a driver of the media access layer 310 receives an HTTP request at a network interface 408a associated with an IPspace. The network driver passes the request to the IP layer 312 where the destination IP address of the request and the IPspace ID 406a are compared with configuration information stored in an IPspace database to select a virtual filer context, e.g., virtual filer 2 (VF1), that owns the request. As a result, a vfiler context data structure 600a for VF1 is associated with the request.

Once the incoming request is associated with a vfiler context, the IP layer 312 issues a system call to set the vfiler context 600a for the current process executing on the filer. Internal to the storage operating system is the notion of a process or thread of control executing on the filer. A process block data structure represents the context of that executing process thread. The process block structure includes the notion of a thread running in a vfiler context. To that end, the process block data structure includes a pointer referencing the current vfiler context. If no vfilers are created/defined on the filer, the processes run in the context of the default vfiler VF0.

The IP layer code 312 passes the request to the appropriate transport protocol layer (e.g., TCP), which determines that the request is destined for a particular port, e.g., the HTTP layer. That is, the TCP layer code 314 examines its protocol control block (PCB) tables to determine if there is a "socket" open for a port number included in the request. The port number is used to identify a particular protocol server of the file system protocol layer, e.g., the HTTP layer protocol. The PCB tables are qualified by vfiler and ipspace ID to thereby enable the TCP layer 314 to determine whether the current vfiler has an open socket. If so, that TCP layer calls into the HTTP protocol layer 322.

The protocol server (HTTP code) executes in the context of the current vfiler and, in particular, its HTTP module. When a variable is referenced, the appropriate variable is retrieved from the HTTP module 630 of the current vfiler context 600a. Also, when the vfiler initializes, a set of initialization routines are executed to allocate memory locations, set variables to known values and create processes with the appropriate vfiler identifier.

When managing its resources over the network, the vfiler administrator can issue a vfiler CLI command within a request to control its vfiler. The per-module data structures associated with a vfiler context 600 include RSH and Telnet module structures 640, 650. These data structures include all information needed for instances of the RSH and Telnet protocols. For example, assume a RSH request relating to a CLI command issued by a vfiler administrator and is received from the network at network interface 408a. The media access layer 310 passes the request to the IP layer 312, which sets the current vfiler context based on the target IP address of the request packet and the interface on which the packet arrived, and then forwards the request to the TCP layer 314. The TCP code then determines whether the current vfiler context executing on the filer has an open socket for the port associated with the RSH protocol.

If so, the TCP layer calls into a RSH daemon process 340 that runs in the context of the current vfiler 600 and its RSH module 640. The RSH daemon 340 calls code that parses the CLI command and delivers that information to a CLI process 350. The CLI layer 350 checks to determine whether the command is valid for the current vfiler context and, if so, executes that command. When executing a valid command, the CLI layer calls code configured to handle execution of the particular request. This code or module is part of the storage operating system and performs functions to determine whether the requested command can be executed.

While there has been shown and described an illustrative embodiment of a system and method that enables a filer configured with a plurality of vfilers to provide pfiler and vfiler administrators, it is to be understood that various other adaptations and modifications may be made within the spirit and scope of the invention. For example, the registry is an administrative API that allows "get/set" operations to be performed on a "namespace" of keys that represent and manipulate administrative data (both persistent and nonpersistent). The namespace of registry keys is evaluated within an administrative context, so that each pfiler and vfiler context has a separate registry namespace 680 (FIG. 6). Just as the "vfiler run" command allows commands in the pfiler context to be mapped into commands in a vfiler context, the administrative mapping layer 619 allows registry keys in the pfiler namespace to be mapped to registry keys in a vfiler namespace. As an example, the registry key:

vfiler.xyz.options.nis.domainname evaluated in a pfiler context would be mapped into the vfiler context of vfiler xyz as the registry key:

options.nis.domainname

This mapping allows objects in the pfiler administrative context to easily access objects in a vfiler administrative context.

Essentially, the registry is "virtualized" so that each vfiler has its own "view" of the registry and its configuration information. However, the pfiler administrator has the capability of viewing each of the individual, virtualized vfiler registries. That is, the pfiler administrator has access to per-vfiler configuration information stored, e.g., in directories (/etc/*) of the registry. The configuration information may also include metafiles related to, e.g. quotas of the vfiler resources.

Moreover, implementation details of the pfiler administrator 500 may include access and control over global (physical filer-wide) configuration information, as well as access to per vfiler configuration information. The pfiler administrator also has access to global CLI as well as to per-vfiler CLI commands, along with global administrative protocols and per-vfiler information, such as status, quotas and configuration information. Such per-filer access is configurable with respect to vfiler privacy (particularly in a SSP environment). That is, per-vfiler access is configurable with respect to commands and statistics that the pfiler administrator may access on a per-vfiler basis.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for operating a data storage system, comprising:
   executing an operating system on a computer;
   storing data by the computer on a plurality of data storage devices;
   executing a physical server administrator by the operating system;
   establishing a plurality of virtual servers by the physical server administrator;
   administering common physical aspects of the plurality of virtual servers by the physical server administrator, including assignment of one or more selected data storage devices of the plurality of data storage devices to a selected virtual server;
   administering logical aspects of one or more virtual servers of the plurality of virtual servers with a virtual server administrator, including specifying quotas for its one or more selected data storage devices;
   designating roles to the physical server administrator and the virtual server administrator using the operating system, each designated role defined by a set of capabilities, the roles of the virtual server administrator and the physical server administrator distinguished by a destination IP address of a request for a service received at a network interface that is bound to an IPspace of the computer;
   reading the destination IP address of the request received at the network interface of the computer, and determining that the request is a command for either the virtual server administrator or the physical server administrator based on the destination IP address; and
   if the request is a command for the virtual server administrator, directing the request to the one or more virtual servers of the plurality of virtual servers and executing the request by the one or more virtual servers, and if the request is a command for the physical server administrator, directing the request to the computer and executing the request by the physical server administrator.

2. The method as in claim 1, further comprising:
   administering by the virtual server administrator those aspects of a virtual server which a client desires to administer.

3. The method as in claim 1, further comprising:
   administering by the physical server administrator aspects of the data storage system including, creating virtual servers, administering virtual servers, administering hardware resources and software objects which represent the hardware objects, administering logical aspects of a server, and administering access control for storage resources.

4. The method as in claim 1, further comprising:
   designating to the virtual server administrator the ability to administer logical aspects of a virtual server, control for storage resources on the virtual server, and IP address for addressing the virtual server.

5. The method as in claim 1, further comprising:
   addressing, by use of a user interface, a subset of the full administrative capability for administrating the virtual server.

6. The method as in claim 1, further comprising:
   addressing the physical server administrator by a first IP address; and
   addressing each virtual server administrator by a different IP address.

7. The method as in claim 1, further comprising:
   initiating a default virtual server upon boot of the computer data storage system, the default virtual server owning all physical resources of the data storage system; and
   configuring each virtual server by the physical server administrator to own selected resources of the physical resources.

8. The method as in claim 1, further comprising:
   dynamically modifying the subset of the full administrative capability for a selected virtual server without disturbing other virtual servers.

9. The method as in claim 1, further comprising:
   receiving a first message by the physical sever administrator;
   creating by the physical sever administrator, in response to the first message, a virtual server and a virtual sever administrator to manage the virtual server; and
   receiving a second message by the virtual server administrator to manage the virtual server.

10. A data storage system, comprising:
    a computer to execute an operating system;
    a plurality of data storage devices connected to the computer, and the computer to store data on the plurality of data storage devices;

a physical server administrator executed by the operating system;

a plurality of virtual servers established by the physical server administrator;

common physical aspects of the plurality of virtual servers administrated by the physical server administrator, including assignment of one or more selected data storage devices of the plurality of data storage devices to a selected virtual server;

logical aspects of one or more virtual servers of the plurality of virtual servers administrated by a virtual server administrator, including specifying quotas for its one or more selected data storage devices;

a destination IP address of a request for a service received at a network interface that is bound to an IPspace of the computer;

the operating system assigning roles designated to the physical server administrator and the virtual server administrator, each designated role defined by a set of capabilities, the roles of the virtual server administrator and the physical server administrator distinguished by reading the destination IP address of the request received at the network interface of the computer, and the operating system to determine that the request is a command for either the virtual server administrator or the physical server administrator based on the destination IP address; and if the request is a command for the virtual server administrator, directing the request to the one or more virtual servers of the plurality of virtual servers and executing the request by the one or more virtual servers, and if the request is a command for the physical server administrator, directing the request to the computer and executing the request by the physical server administrator.

11. The data storage system as in claim 10, further comprising:
the virtual server administrator administering those aspects of a virtual server which a client desires to administer.

12. The data storage system as in claim 10, further comprising:
the physical server administrator administrating aspects of the data storage system including, creating virtual servers, administering virtual servers, administering hardware resources and software objects which represent the hardware objects, administering logical aspects of a server, and administering access control for storage resources.

13. The data storage system as in claim 10, further comprising:
the physical server administrator designating to the virtual server administrator the ability to administer logical aspects of a virtual server, control for storage resources on the virtual server, and IP address for addressing the virtual server.

14. The data storage system as in claim 10, further comprising:
a user interface to address the subset of the full administrative capability for administrating the virtual server.

15. The data storage system as in claim 10, further comprising:
a first IP address to address the physical server administrator; and
a different IP address to address each virtual server administrator.

16. The data storage system as in claim 10, further comprising:
a default virtual server initiated upon boot of the computer data storage system, the default virtual server owning all physical resources of the data storage system; and
the physical server administrator to configure each virtual server to own selected resources of the physical resources.

17. The data storage system as in claim 10, further comprising:
a processor to dynamically modify the subset of the full administrative capability for a selected virtual server without disturbing other virtual servers.

18. The data storage system as in claim 10, further comprising:
a first message received by the physical sever administrator;
the physical sever administrator to create, in response to the first message, a virtual server and a virtual sever administrator to manage the virtual server; and
a second message received by the virtual server administrator to manage the virtual server.

19. A computer readable persistent physical storage media, comprising:
said computer readable media containing instructions for execution on a processor for the practice of a method of operating a data storage system, the method,
executing an operating system on a computer;
storing data by the computer on a plurality of data storage devices;
executing a physical server administrator by the operating system;
establishing a plurality of virtual servers by the physical server administrator;
administering common physical aspects of the plurality of virtual servers by the physical server administrator, including assignment of one or more selected data storage devices of the plurality of data storage devices to a selected virtual server;
administering logical aspects of one or more virtual servers of the plurality of virtual servers with a virtual server administrator, including specifying quotas for its one or more selected data storage devices;
designating roles to the physical server administrator and the virtual server administrator using the operating system, each designated role defined by a set of capabilities, the roles of the virtual server administrator and the physical server administrator distinguished by a destination IP address of a request for a service received at a network interface that is bound to an IPspace of the computer;
reading the destination IP address of the request received at the network interface of the computer, and determining that the request is a command for either the virtual server administrator or the physical server administrator based on the destination IP address; and
if the request is a command for the virtual server administrator, directing the request to the one or more virtual servers of the plurality of virtual servers and executing the request by the one or more virtual servers, and if the request is a command for the physical server administrator, directing the request to the computer and executing the request by the physical server administrator.

20. The method as in claim 1, further comprising:
using a writeable persistent storage device as a data storage device of the plurality of data storage devices.

21. The method as in claim 1, further comprising:
using a memory as a data storage device of the plurality of data storage devices.

22. The method as in claim 1, further comprising:
using a disk as a data storage device of the plurality of data storage devices.

23. The method as in claim 1, further comprising:
using a tape as a data storage device of the plurality of data storage devices.

24. The method as in claim 1, further comprising:
using a Redundant Array of Independent Disks (RAID) as a data storage device of the plurality of data storage devices.

25. The data storage system as in claim 10, further comprising:
a memory used as a data storage device of the plurality of data storage devices.

26. The data storage system as in claim 10, further comprising:
a disk used as a data storage device of the plurality of data storage devices.

27. The method as in claim 10, further comprising:
using a tape as a data storage device of the plurality of data storage devices.

28. The data storage system as in claim 10, further comprising:
using a Redundant Array of Independent Disks (RAID) as a data storage device of the plurality of data storage devices.

* * * * *